UNITED STATES PATENT OFFICE.

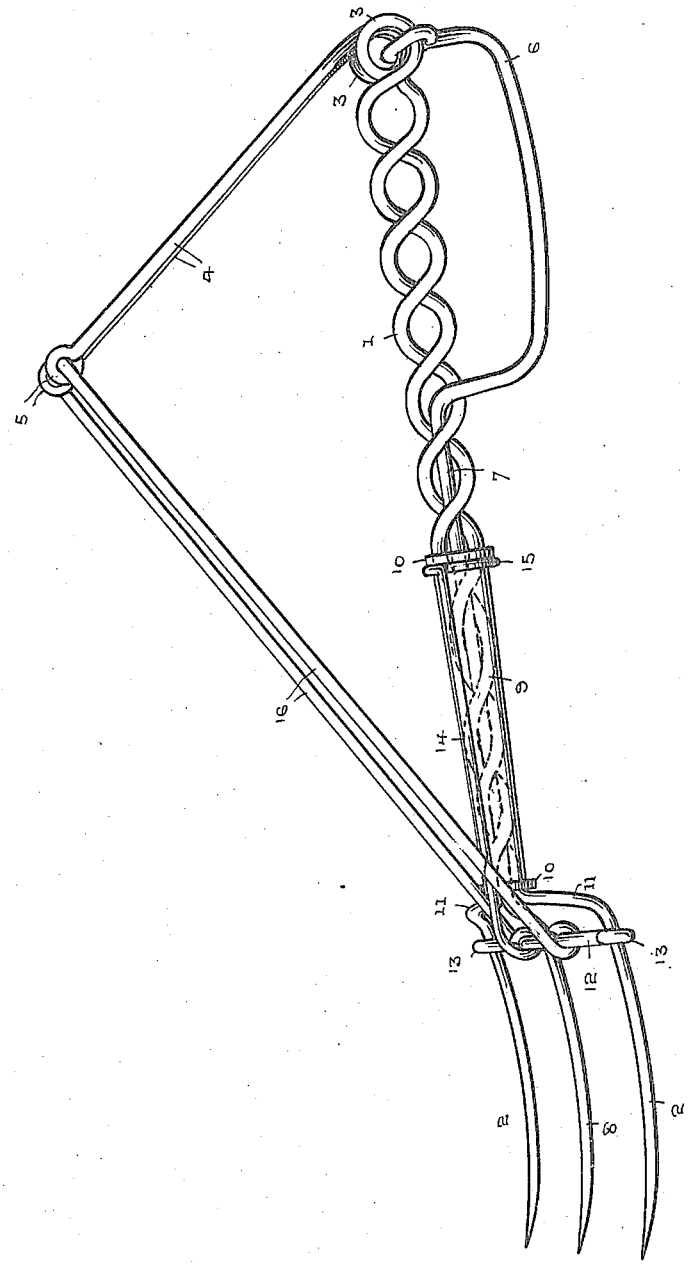

WILLIAM HAWKINGS JOHNSON, OF PINE BLUFF, ARKANSAS.

COOKING-FORK.

1,265,087.

Specification of Letters Patent.

Patented May 7, 1918.

Application filed July 20, 1917. Serial No. 181,914.

*To all whom it may concern:*

Be it known that I, WILLIAM HAWKINGS JOHNSON, a citizen of the United States, residing at Pine Bluff, in the county of Jefferson and State of Arkansas, have invented certain new and useful Improvements in Cooking-Forks; and I do hereby declare the following to be a full, clear, and exact description of the invention, such as will enable others skilled in the art to which it appertains to make and use the same.

This invention relates to new and useful improvements in forks and more particularly to a cooking fork, the tines of which are provided with a slide bar connected to the ends of a pair of spring arms carried by the outer end of the fork handle and which when actuated will move the slide bar longitudinally of the tines to disengage an article therefrom, said spring arms upon being released automatically returning the slide bar to its normal position.

A further object of the invention is to provide stop means for limiting the movement of the slide bar so that it can not be disengaged from the tines when actuated.

A further object of the invention is to provide a fork of the above stated character, which is of simple, cheap and inexpensive construction, and which is durable and substantial in design.

With these and other objects in view, the invention comprises the various novel features of construction, combination and arrangement of parts as will be more fully described hereinafter and afterward specifically claimed.

Referring to the drawings,

The figure shown represents a perspective view of my novel construction of fork.

Similar characters of reference are used to denote corresponding parts throughout the accompanying drawings and the following description.

In order that the construction and operation of the invention may be readily comprehended, I have illustrated an approved embodiment thereof in the accompanying drawings and will now proceed to fully describe the same, in connection with said drawings, in which the reference numeral 1 indicates the handle of the fork which is constructed of twisted wire, and preferably of two strands of wire. The inner ends of the strands of wire terminate in tines or prongs 2 while the outer ends of the strands are coiled to provide eyes 3 and terminate in angularly and inwardly projecting spring arms 4, the ends of which are coiled to provide eyes 5.

The handle 1 is provided with a substantially U-shaped wire guard 6, one end of which is coiled through the eyes 3 and securely attached thereto, while the other end is extended into and longitudinally through the inner end of the handle as indicated by the numeral 7 and terminates in a central tine or prong 8. The wire portion 7 is disposed through the twists of the inner portion of the wire handle so as to be securely held in place.

A metal sleeve 9 surrounds the inner end of the handle and is provided at opposite ends with laterally projecting flanges 10, the flange at the inner end of the sleeve resting upon the shoulders 11 of the tines 2.

A slide bar 12, in this instance consists of a piece of wire having its terminal ends coiled to provide eyes 13 for the reception of the tines 2. A wire member 14 has its inner end coiled around and attached to the intermediate portion of the slide bar 12 and its outer end provided with a transversely coiled ring 15 surrounding and slidably mounted on the sleeve 9. The flanges 10 are adapted to limit the movement of the ring 15 in either direction so as to prevent the slide bar 12 from being disengaged from the tines 2 when actuated.

A pair of arms 16 are connected at one end to the eyes 5 of the spring arms 4 and are connected at their other ends to the slide bar 12 on opposite sides of the member 14.

In the use of the fork and after the tines have been engaged with an article, the same may be readily disengaged therefrom by pressing the spring arms 4 inwardly against the handle 1 which will cause the arms 16 to move the slide longitudinally of the tines and thus quickly and effectively disengage the article therefrom. As soon as the article has been disengaged from the tines, the slide bar will be returned to its normal position immediately upon the releasing of the spring arms 4. It will also be apparent that by the provision of the slide ring 15 connected with the slide bar that the movement of the latter will be limited in either direction.

I claim:

1. A fork comprising a handle, a pair of tines carried by the inner end of said handle, a slide bar mounted on said tines, a pair of spring arms carried by the outer end of said handle and projecting inwardly at an angle thereto, a pair of actuating arms connected to the inner ends of the spring arms and to said slide bar, and stop means to limit the movement of said slide bar in either direction on said tines.

2. A fork comprising a handle, a pair of tines carried by the inner end of said handle, a slide bar mounted on said tines, a sleeve mounted on the inner end of said handle and provided at opposite ends with lateral flanges, a slide ring mounted on said sleeve, a member connecting said slide ring with said slide bar, said lateral flanges limiting the movement of the slide ring in either direction, and spring tension means for reciprocating the slide bar on said tines.

3. A fork comprising a handle consisting of twisted wire strands, the inner ends of said wire strands terminating in spaced tines, while the outer ends are coiled to provide eyes and terminate in spring arms projecting inwardly at an angle to said handle, a slide bar mounted on said tines, actuating arms connecting said slide bar with said spring arms, a U-shaped guard for the outer end of said handle having one end coiled through and attached to said eyes and its other end extending into and longitudinally through the inner end of said handle and terminating in a tine disposed intermediate of said first named tines, and means for limiting the outward movement of said slide bar on said tines.

In testimony whereof I have signed my name to this specification in the presence of two subscribing witnesses.

WILLIAM HAWKINGS JOHNSON.

Witnesses:
R. A. FULCH,
H. H. WOOD.

Copies of this patent may be obtained for five cents each, by addressing the "Commissioner of Patents, Washington, D. C."